United States Patent [19]

Kriger

[11] Patent Number: 4,999,982
[45] Date of Patent: Mar. 19, 1991

[54] WEEDER FOR INLAND WATERWAYS

[76] Inventor: Earle Kriger, 25 LeRoi Dr., Pittsfield, Mass. 01201

[21] Appl. No.: 488,499

[22] Filed: Mar. 2, 1990

Related U.S. Application Data

[63] Continuation of Ser. No. 238,060, Aug. 30, 1988, abandoned.

[51] Int. Cl.$^5$ .......................... A01D 44/00; B66C 1/00
[52] U.S. Cl. ........................................ 56/8; 56/400.01; 294/66.1; 294/53.5
[58] Field of Search ..................... 294/66.1, 49, 50.6, 294/52, 53.5; 37/55, 119, 120, 135; 56/8, 400.01–400.04, 400.07, 400.14, 400.16, 400.21; 172/378–380

[56] References Cited

U.S. PATENT DOCUMENTS

| | | | |
|---|---|---|---|
| D. 190,822 | 7/1961 | Morreale | D40/1 |
| 373,646 | 11/1887 | Cook | 37/119 |
| 898,306 | 9/1908 | Bodenstein | 56/8 |
| 1,312,241 | 8/1919 | Faulkner | 294/66.1 |
| 1,352,386 | 9/1920 | Rundberg | 56/400.06 |
| 2,050,133 | 8/1936 | Smith | 56/8 |
| 2,610,458 | 9/1952 | Hay et al. | 56/8 |
| 2,887,170 | 5/1959 | Fenicchia | 56/400.05 |
| 3,113,389 | 12/1963 | Vuskovich | 37/119 |
| 3,146,831 | 9/1964 | McConnell | 56/400.04 |
| 3,499,271 | 3/1970 | Drigert et al. | 56/8 |
| 3,863,237 | 1/1975 | Doerr | 294/55 X |
| 3,927,636 | 12/1975 | Childers et al. | 294/66.1 X |
| 4,005,756 | 2/1977 | Morse, Jr. | 56/400.16 X |
| 4,375,299 | 3/1983 | Laven | 294/19 R |
| 4,713,929 | 12/1987 | Smith | 56/8 |
| 4,828,690 | 5/1989 | Montez | 37/119 X |

FOREIGN PATENT DOCUMENTS

| | | | |
|---|---|---|---|
| 1170185 | 5/1964 | Fed. Rep. of Germany | 56/8 |
| 674880 | 7/1952 | United Kingdom | 294/50 |

Primary Examiner—Margaret A. Focarino
Assistant Examiner—Dean J. Kramer
Attorney, Agent, or Firm—Mason, Fenwick & Lawrence

[57] ABSTRACT

A weeder capable of removing large and small sized weeds from inland waterways is arranged for towing off the back of a row boat as well as for manual operation. The weeder is in the form of a rectangular expanded metal section pivotally attached to towing ropes at opposite ends. The sides of the expanded metal section are sheared to form a V-groove or slot configuration for trapping the weeds along the bed of the waterway where the roots meet the weed stalk. The expanded metal perforations allow the weeds to be carried to the surface of the water while allowing the water to escape between the perforations. One side of the expanded metal section is provided with an additional expanded metal section to form V-grooves of smaller width to remove the smaller weeds.

17 Claims, 6 Drawing Sheets

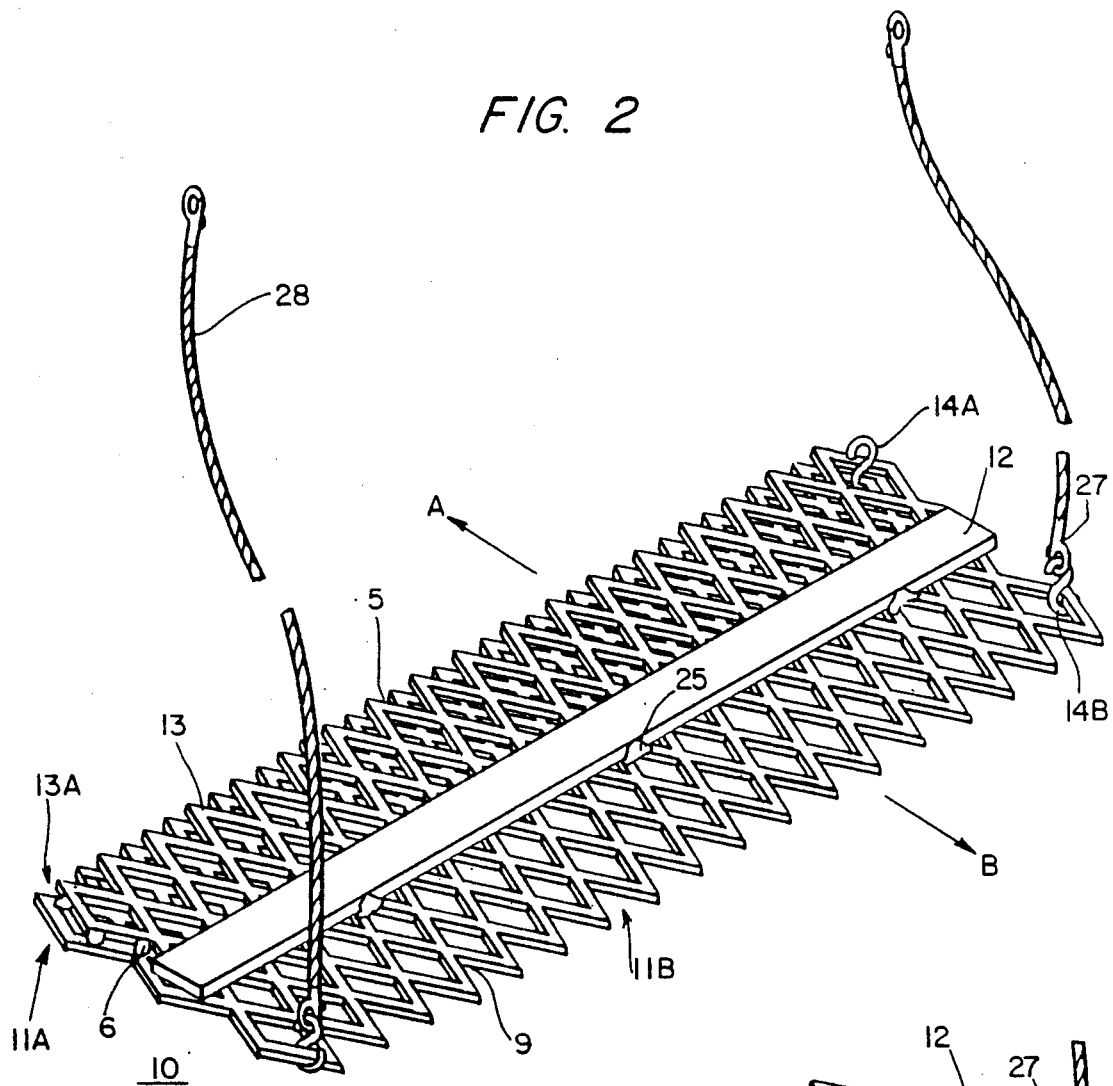

WEEDER FOR INLAND WATERWAYS

This application is a continuation of application Ser. No. 238,060 filed Aug. 330, 1988, now abandoned.

BACKGROUND OF THE INVENTION

Aquatic weeds have long been a problem for persons enjoying property located on inland lakes, ponds, and rivers. The weeds grow uncontrolled to lengths in excess of several feet to interfere with swimming and boating usage.

Earlier attempts to remove such weeds from along the shore out to some distance therefrom, have not heretofore proven successful. Hand-operated cutting tools in the form of sickles and hoes were limited due to the poor visibility through the water when the water was disturbed. The cut weeds which float to the surface are removed in a separate operation either by hand or by means of a rake or similar tool. The cut weeds which sink to the bottom regenerate and form new growth. Dredgers in the form of chains drained along the water bed by means of a row boat to trap the weeds were not as effective as tools that employed blades or blade-like edges to cut the weeds.

U.S. Pat. No. 4,375,299 entitled "Aquatic Weeder" describes a hand held weeder useful for cutting weeds growing beneath the surface of such inland waterways. The weeder is moved back and forth to cut the weeds in shallow waters and remove them from the underwater soil surface. The weeds are later gathered at the surface and taken to the shore for disposal.

U.S. Pat. DES. 190,822 entitled "Underwater Weed Cutter" shows a weeder device having a plurality of serrated blades along one surface for cutting weeds from the underwater soil surface with a screen-like implement for catching the weeds and towing them behind a boat for later disposal.

The present invention proposed is an underwater weed removal device that is either hand-operated or boat-towed for engaging and holding the weeds at the juncture of their root and stalk assembly, removing the roots from the soil, and dragging the roots and stalks, i.e., the entire weeds, to the surface in a single operation.

SUMMARY OF THE INVENTION

The invention comprises a first rectangular body of expanded metal having rope-engaging swivels attached to the opposite corners thereof. A metal reinforcement bar is positioned along the body, parallel to the longer sides. An additional rectangular metal body of expanded metal of lesser width than the first body is attached to the first body between the metal reinforcement bar and a longitudinal edge of the first body. The edges of the expanded metal bodies provide a first edge having V-grooves of a first width for capturing larger weeds and V-grooves of shorter width for capturing smaller sized weeds. A pivoted handle support can be optionally attached to the center of the support bar for hand-operation.

BRIEF DESCRIPTION OF THE DRAWINGS

FIG. 2 is a top perspective view of an alternate embodiment of the weeder of FIG. 1, with towing ropes attached;

FIG. 2A is a top perspective view of a further embodiment of the weeder of FIG. 1;

DESCRIPTION OF THE PREFERRED EMBODIMENTS

Figure 1:
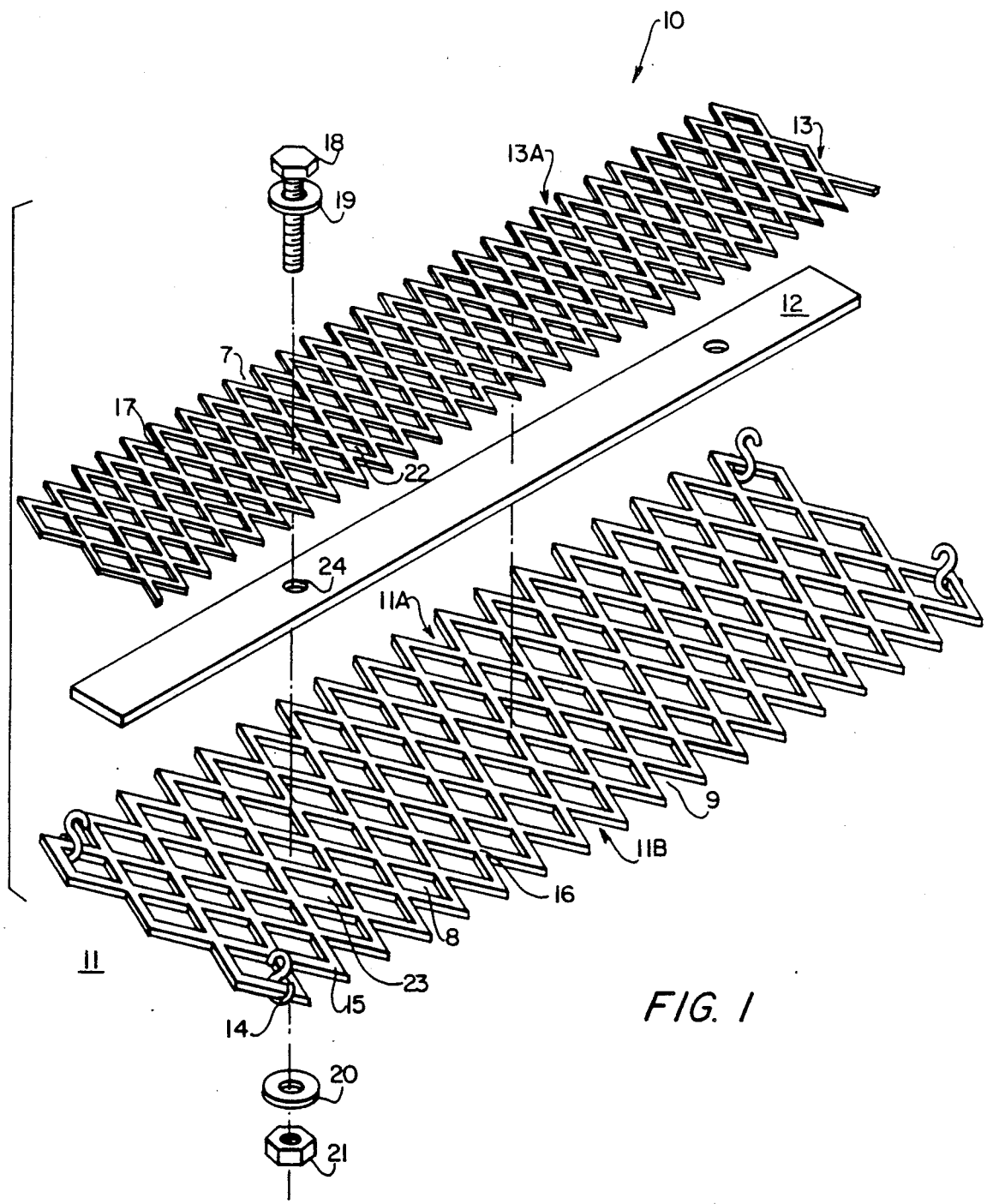
FIG. 1 is an exploded perspective view of a waterway weeder in accordance with the invention, with the component parts in isometric projection.

The waterway weeder 10 is shown in FIG. 1 in exploded perspective, and comprises a planar expanded metal body 11, metal support bar 12 and a planar expanded metal body 13. The expanded metal bodies 11 and 13 have a plurality of diamondshaped openings 8 between elements 22 and 23, respectively. When the elements 22, 23 are cut edgewise, a corresponding plurality of V-grooves 7 and 9 are defined along the cut edges 13A, and along edges 11A and 11B. The significance of the V-grooves 7 and 9 will be described below in greater detail. A metal bar 12 formed from a carbon steel composition is on top of the body 11 parallel to the edges 11A, 11B. The narrow expanded metal body 13 having a plurality of V-grooves 7 along one edge 13A is then attached to the bar 12 and to the body 11 by aligning link 22 in the narrow chain link 13 and in the body with the thru-hole 24 in the support bar 12. The chain bodies and the bar 12 are fastened together by means of bolt 18, washers 19, 20 and nut 21. Alternatively, body 11 and the bar 12 can be placed over both bodies 11 and 13 before bolting. In high speed assembly operations, the narrow body 13 can be edge-welded or brazed to body 11 as depicted at 6 in FIG. 2 for example. Four S-shaped swivel hooks or rings 14 are attached to the four opposing corners of the body 11 to facilitate the attachment of ropes or cords 28 as also shown in FIG. 2.

As shown in FIG. 2, weeder 10 is arranged for towing by the attachment of two or more cords 28 by means of connectors 27 attached to opposite ends of the cord. In the weeder 20, the bar 12 can also be edge-welded or brazed to the body 11 as shown at 25 in a high speed automated assembly process. When the narrow body 13 is attached to body 11, a plurality of narrow V-grooves are defined along the composite edge defined by the edge 13A of the narrow body 13 and the edge 11A of narrow body 11. The opposing edge IIB provides a plurality of larger V-grooves 9 for engaging, holding and extracting larger-sized weeds when the cords 28 are attached to swivel hooks 14B and the rake 10 is towed in the direction indicated by arrow B. When the cords 28 are attached to the opposite swivels, one of which is indicated at 14A and the other omitted for purposes of clarity, and the rake 10 is dragged in the direction indicated by arrow A along the underwater solid surface, the smaller weeds are caught, held and pulled form the soil by the narrower V-grooves 5.

A less expensive variation of the weeder of the invention, is provided by rake 10, shown in FIG. 2A, which comprises an expanded metal body 11 having V-grooves 9 on opposing sides and is attached to the towing ropes 28 directly without using any type of swivel hooks. A reinforcing bar 12 is attached to the body 11 for added stability and weight to insure that it remains in contact with the weeds growing along the bed of the waterway. The reinforcing bar 12 which adds strength and weight to the body 11 for sinking it to the bottom underwater soil surface; however, bar 12 can be eliminated if the expanded metal of body 11 is of sufficiently heavy gauge.

Figure 2B:
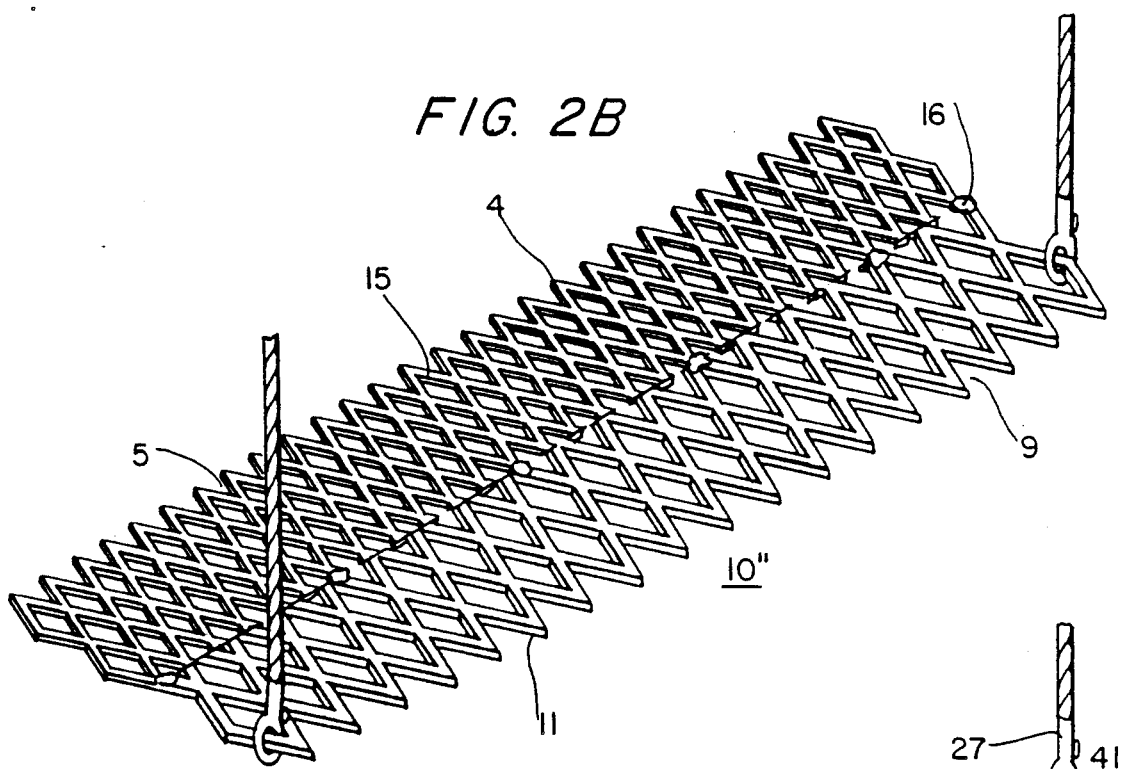
FIG. 2B is a top perspective view of a further embodiment of the weeder of FIG. 2A.

Another simple and inexpensive embodiment of the weeder of the invention is provided by rake 10" shown in FIG. 2B, wherein an expanded metal body 11 is directly welded as indicated at 16 to an expanded metal body 4 having closely spaced elements 15 to define a plurality of narrow V-grooves 5 on one edge. A plurality of regular sized V-grooves 9 are formed on body 11 on the opposite side therefrom.

Figure 3:
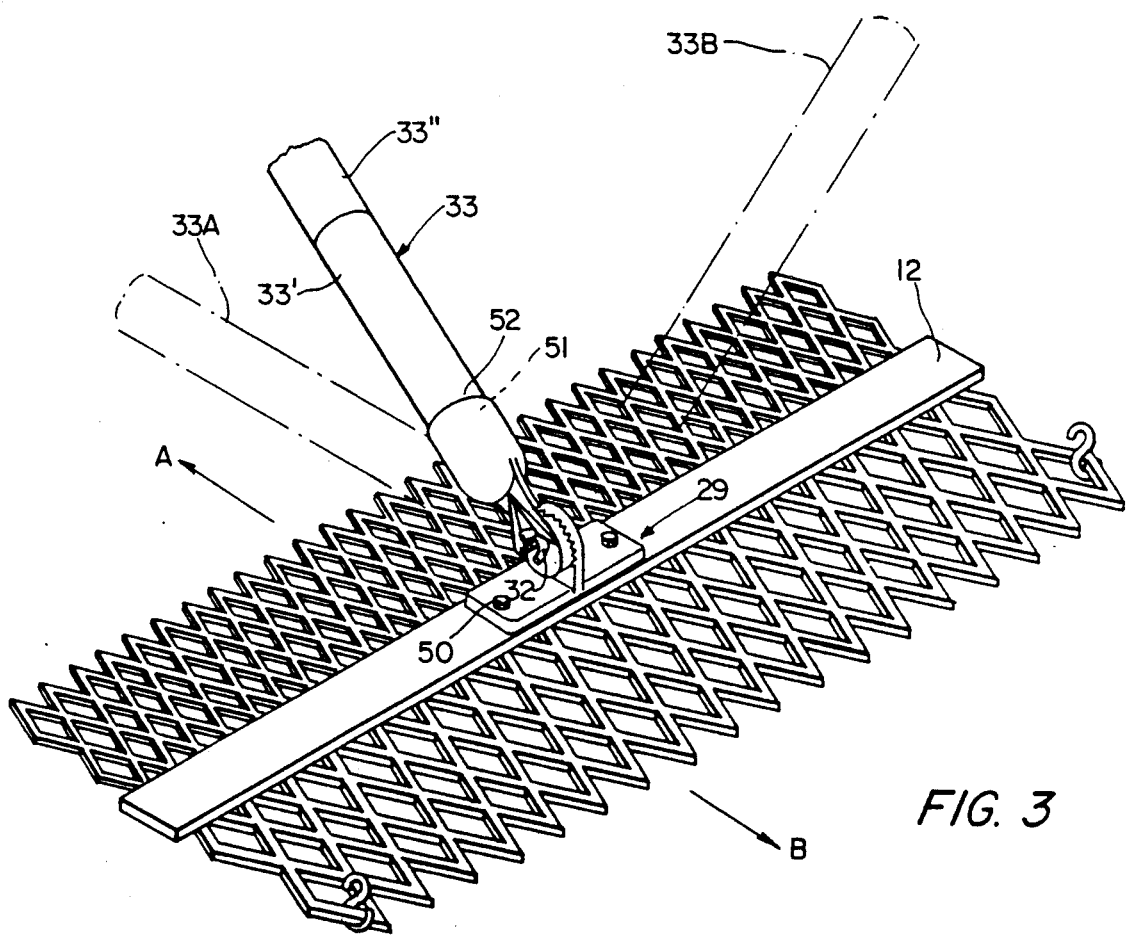
FIG. 3 is a top perspective view of an alternate embodiment of the weeder of FIG. 1, with a handle attached.
Figure 3A:
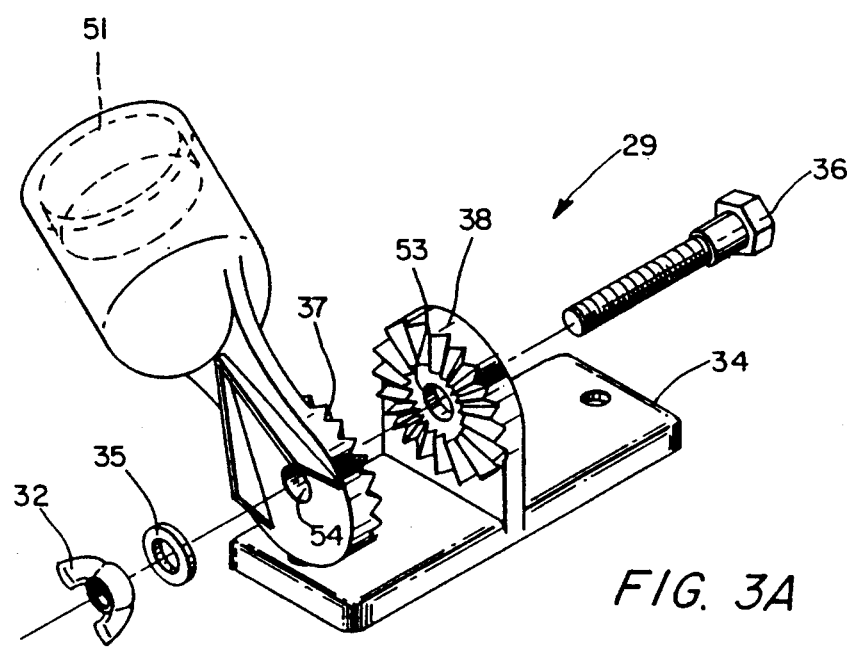
FIG. 3A is a front perspective view of the handle attachment assembly of FIG. 3.
Figure 5:
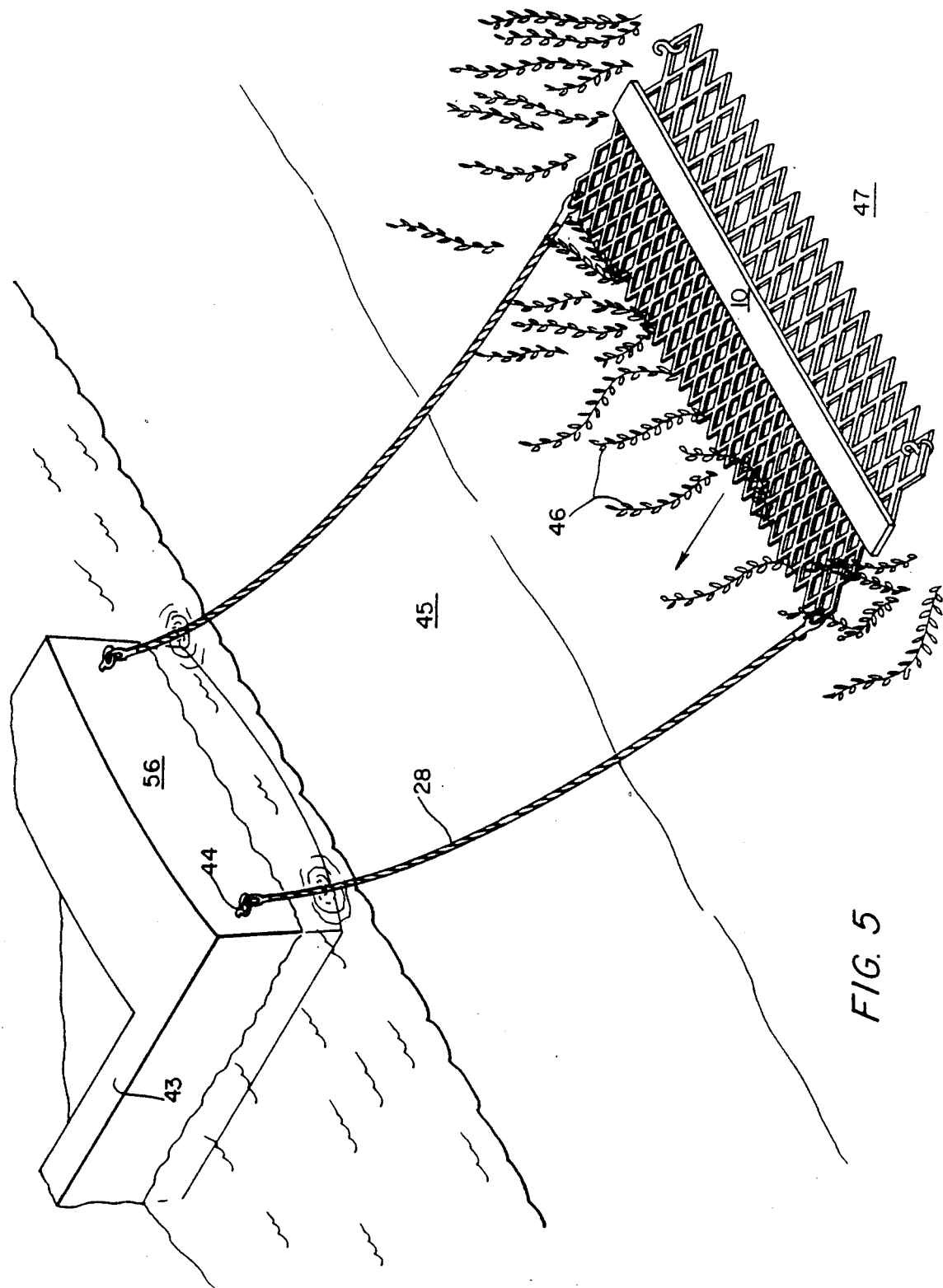
FIG. 5 is a perspective view of the weeder of FIG. 2 shown attached to the transom of a row boat.

Besides being towed behind a row boat such as indicated at 43 in FIG. 5 for example, the weeder 10 is also capable of being hand-operated as best seen by referring to FIG. 3 and FIG. 3A. A two part arcuate bracket 29 is attached to the support bar 12 by bolts 50 through plate 34 of one part of bracket 29. One end of the other part of bracket 29 is internally threaded as indicated at 51 to accept the threaded end 52 of a handle 33. The handle 33 comprises plurality of sections 33', 33" which are joined together to provide any desired length.

As shown in FIG. 3A, a post 38 extends upwardly from the plate 34, and has a hole 53 surrounded by a knurled surface: the other part of the bracket 29 has a plate 37 which is also knurled for engagement with the knurled surface of the post 38; a hole 54 therein is aligned with the hole 53 and post 38, so that a bolt 36 may be passed through them, and secured by wing nut 32 and washer 35. As will be apparent, this permits the securing of the handle 33 at any desired angle, so that the angle of the handle 33 can be adjusted to various angles as indicated in phantom at 33A and its direction can be reversed as indicated at 33B. This allows the angle of the weeder to be adjusted with respect to the operator as well as the bottom of the waterway which in turn provides more positive drag on the weed roots. This also allows the weeder to be drawn in the A direction for example when the handle is located at position 33A and in the direction B when the operating handle 33 is located at 33B. The operator can first remove the larger weeds and then change the position of the handle 33 and retrace his steps to remove the smaller weeds.

Figure 4:
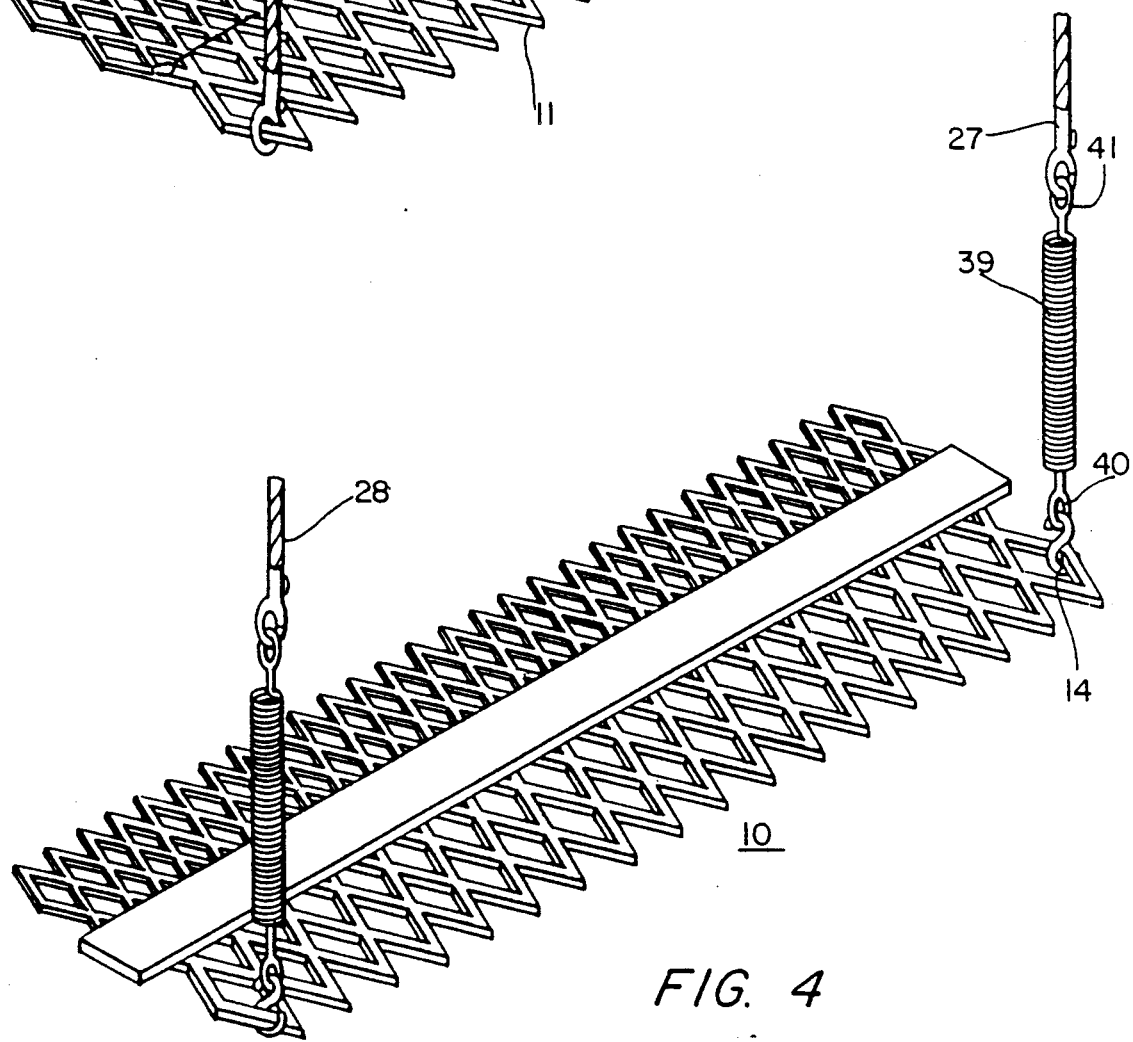
FIG. 4 is a top perspective view of an alternative embodiment of the weeder depicted in FIGS. 1 and 2.

The weeder 10 is depicted in FIG. 4 with a pair of heavy compression springs 39, similar to those used with overhead garage doors, attached intermediate the S-shaped swivel hooks 14 and the cords 28. One spring end 40 is attached directly to the S-shaped hook 14 and the other spring end 41 is attached to the connector 27 attached to the end of the cords 28. The heavy expansion springs 39 assist in lifting the weeder upwards through the water. The water resistance to the weeder, when loaded with weeds, causes the springs to elongate when the weeder is lifted from the bottom of the water. The energy stored in the springs alternately releases to assist the operator during upward motion of the weeder toward the water surface.

The towing operation of the weeder 10 is shown in FIG. 5 wherein the weeder is towed by a row boat 43 by means of the pair of cords 28 that are attached to a corresponding pair of hooks 44 fastened to the boat transom 56. The weeder is drawn along the underwater soil bed 47 in a horizontal direction to capture the weeds 46 at the junction of the soil 47 with the water 45 and to hold and remove them.

Figure 6:
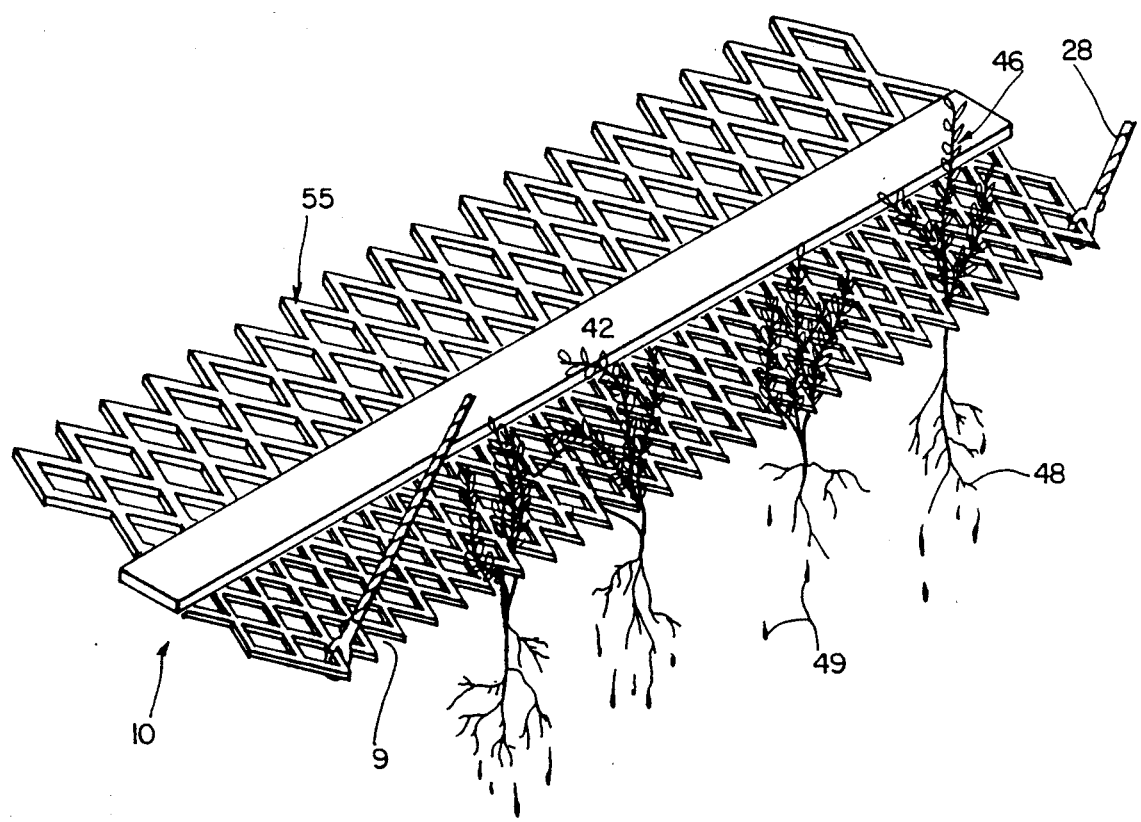
FIG. 6 is a front perspective view of the weeder depicted in FIG. 5 being withdrawn from the water.

The multi-functional features of the weeder 10 can be seen by referring now to FIG. 6 wherein the weeder is depicted carrying a plurality of weeds 46 of the type consisting of stalks 42 and roots 48. When the weeder is drawn along the underwater soil surface, the stalks 42 become captured within the V-grooves 9 such that they lay along the top surface 55 of the weeder. When the weeder is removed from the water by means of cords 28, the water depicted as droplets 49 drains through the opening 8 while the weeds 46 remain entrapped on the top surface.

An effective means for removing weeds from inland waterways has herein been described whereby the weeds are engaged at the junction of the soil with the water and are held and removed by means of a simple, efficient and economical device. The weeds are removed in a single operation without additional equipment or additional gathering steps.

The claims and the specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

Having thus described my invention, what I claim as new and desire to secure by Letters Patent is:

1. A weeder for engaging and removing aquatic weeds from the underwater soil at the bottom of waterways comprising:
    a body for pulling weeds, said body being substantially planar and having at least one edge and a plurality of openings therethrough spaced from said edge,
    means attached to said body for causing said body to move through water with said body and said edge substantially parallel to and at the surface of the underwater soil, and
    means at said edge of said body comprising V-grooves for engaging the portions of weeds above said soil and for removing the roots of the engaged weeds from said soil as said body is moved by said moving means,
    said openings being throughout said body and permitting water to pass through said body when said body and weeds engaged by said V-grooves are moved upwardly from the said underwater soil surface.

2. The weeder of claim 1, and a second body attached to said first mentioned body, said second body being of lesser width than said first body and having an edge thereof overlying said edge of said first body, said edge of said second body having V-grooves of different width than said V-grooves of said first body.

3. The weeder of claim 2, said V-grooves of said second body being of lesser width than said V-grooves of said first body.

4. The weeder of claim 1 wherein said means attached to said body comprise swivel hooks.

5. The weeder of claim 4 wherein said body is rectangular and said swivel hooks are located at all four opposing corners of said body.

6. The weeder of claim 1, and further comprising reinforcement bar means secured to said body for adding strength and weight thereto.

7. The weeder of claim 1 wherein said means attached to said body comprise two ropes.

8. The weeder of claim 7, wherein said tow ropes have connectors at one end for attaching to said attachment means.

9. The weeder of claim 7, and further comprising spring means attached to said tow ropes for assisting in lifting said body from said bottom.

10. The weeder of claim 1, wherein said means attached to said body comprises a handle.

11. The weeder of claim 10, and means for securing said handle to said body inn any one of a plurality of angular positions.

12. The weeder of claim 11 wherein said body is rectangular with longitudinal edges and said securing means comprises means for securing said handle so as to be positioned over either of said edges of said body.

13. Thhe weeder of claim 1 wherein said body is of expanded metal.

14. A weeder for inland waterways comprising:
a first rectangular substantially planar body of expanded metal having a plurality of first diamond-shaped openings throughout said body, said body having a first set of V-grooves of a first width onn one edge, said first V-grooves being arranged for removing first sized weeds from a bottom of a waterway;
a second rectangular body of expanded metal having a plurality of second diamond-shaped openings throughout said second body, having a width less than the width of said first body and having V-grooves at the edges thereof having a width smaller than and overlying the V-grooves of said first body for removing second sized weeds from said waterway bottom, said second sized weeds being smaller than said first sized weeds; and
means at opposing ends of said first body for moving said bodies substantially horizontally along a bottom of the waterways;
said first and second openings permitting water to pass through said body when said body and weeds removed thereby are moved to the surface of the water.

15. A weeder for inland waterways comprising:
a first rectangular body of expanded metal of predetermined length and width and having a plurality of first diamond-shaped openings, said first body at one edge thereof having V-grooves of a first width for removing first sized weeds from a bottom of a waterway;
a second rectangular body of expanded metal having a plurality of second diamond-shaped openings attached to one surface of said first body, said second diamond-shaped openings being of smaller size than said first diamond-shaped openings; and
said second rectangular body having an edge overlying said one edge of said first body and having at said edge V-grooves of a second width, said second V-grooves being of a smaller width than the width of said first V-grooves.

16. A method for removing weeds from soil underlying inland waterways comprising the steps of:
providing a substantially planar body having an edge with a plurality of V-grooves extending therealong and openings through said body;
moving said body along a bottom of an inland waterway with said body and said edge adjacent the said waterway bottom and engaging and holding weeds thereon by said V-grooves at a junction of said weeds with said bottom and removing the roots of said weeds from said soil by pulling on said weeds by said movement of said body; and
lifting said body together with said weeds, including said roots, through said water with water passing through at least some of said openings, whereby said weeds remain on said body for subsequent removal therefrom and disposal.

17. A weeder for engaging and removing aquatic weeds from the underwater soil at the bottom of waterways comprising:
a body for pulling weeds, said body having at least one edge and a plurality of openings therethrough spaced from said edge,
means attached to said body for causing said body to move through water with said body and said edge substantially parallel to and at the surface of the underwater soil, and
means at said edge of said body comprising V-grooves for engaging the portions of weeds above said soil and for removing the roots of the engaged weeds from said soil as said body is moved by said moving means,
said body being constructed to provide, rearwardly of said edge, minimal resistance to being pulled through the water with said edge at the front of said body,
said openings being substantially throughout said body for permitting water to pass through said body when said body and weeds engaged by said V-grooves are moved upwardly from the said underwater soil surface.

* * * * *